United States Patent
Ophir et al.

(10) Patent No.: US 8,792,450 B2
(45) Date of Patent: Jul. 29, 2014

(54) SYSTEM AND METHOD FOR PROVIDING LOCAL IP CONNECTIVITY FOR A ROAMING MOBILE SUBSCRIBER

(75) Inventors: Shai Ophir, Moshav Ein-Vered (IL); Li-On Raviv, Petach Tikva (IL); Ory Biran, Kiryat-Tivon (IL); Shany Elkarat, Tel-Mond (IL)

(73) Assignee: StarHome GmbH, Zurich (CH)

( * ) Notice: Subject to any disclaimer, the term of this patent is extended or adjusted under 35 U.S.C. 154(b) by 834 days.

(21) Appl. No.: 12/078,784

(22) Filed: Apr. 4, 2008

(65) Prior Publication Data

US 2008/0280605 A1 Nov. 13, 2008

Related U.S. Application Data

(60) Provisional application No. 60/996,085, filed on Oct. 26, 2007, provisional application No. 60/924,374, filed on May 10, 2007.

(51) Int. Cl.
*H04W 4/00* (2009.01)
*G01R 31/08* (2006.01)

(52) U.S. Cl.
USPC .................................. 370/331; 370/236

(58) Field of Classification Search
USPC ............................................. 370/331
See application file for complete search history.

(56) References Cited

U.S. PATENT DOCUMENTS

| | | | |
|---|---|---|---|
| 7,577,427 B2 * | 8/2009 | Bicker et al. | 455/417 |
| 2002/0061746 A1 * | 5/2002 | Jo et al. | 455/433 |
| 2002/0142753 A1 * | 10/2002 | Pecen et al. | 455/411 |
| 2002/0197991 A1 * | 12/2002 | Anvekar et al. | 455/432 |
| 2004/0015692 A1 * | 1/2004 | Green et al. | 713/169 |
| 2004/0162998 A1 * | 8/2004 | Tuomi et al. | 713/202 |
| 2004/0176092 A1 * | 9/2004 | Heutschi | 455/435.1 |
| 2004/0176129 A1 * | 9/2004 | Menon et al. | 455/554.1 |
| 2005/0070278 A1 * | 3/2005 | Jiang | 455/432.3 |
| 2005/0177733 A1 * | 8/2005 | Stadelmann et al. | 713/185 |
| 2005/0192035 A1 * | 9/2005 | Jiang | 455/461 |
| 2006/0276226 A1 * | 12/2006 | Jiang | 455/558 |
| 2006/0291455 A1 * | 12/2006 | Katz et al. | 370/355 |
| 2007/0047523 A1 * | 3/2007 | Jiang | 370/352 |
| 2007/0213075 A1 * | 9/2007 | Jiang | 455/461 |
| 2007/0268889 A1 * | 11/2007 | Heutschi et al. | 370/352 |
| 2008/0261565 A1 * | 10/2008 | Kunz et al. | 455/414.1 |
| 2008/0318571 A1 * | 12/2008 | Vikberg et al. | 455/435.2 |
| 2010/0048197 A1 * | 2/2010 | Jiang | 455/422.1 |

* cited by examiner

*Primary Examiner* — Gerald Smarth

(57) ABSTRACT

A system installed at a roaming mobile network, comprises: a signaling relay enabled to monitor, intercept and modify mobile network signaling messages between the roaming network and the home network, a controller application for the signaling relay, said controller configured to instruct the signaling relay to replace an identity of a roaming user with a local network subscriber identity, thereby to enable registration of the roaming user with the local network for receiving at least one local mobile service as a local user, the roamer retaining a pre-existing registration with a respective home mobile network for receiving at least one other roaming mobile service, wherein authentication of the mobile device with the roaming network uses authentication data of the home network registration.

5 Claims, 1 Drawing Sheet

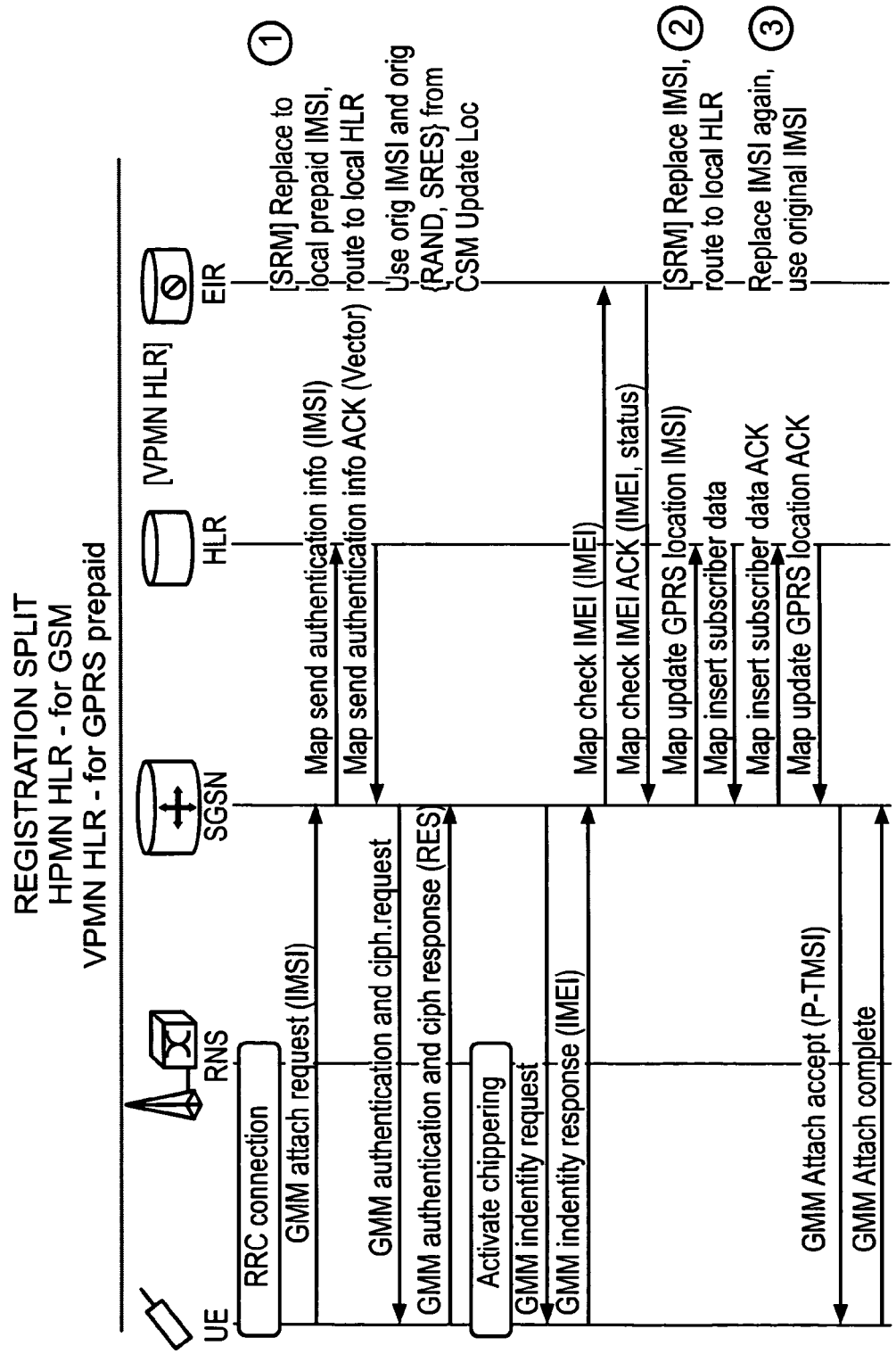

SYSTEM AND METHOD FOR PROVIDING LOCAL IP CONNECTIVITY FOR A ROAMING MOBILE SUBSCRIBER

RELATIONSHIP TO EXISTING APPLICATIONS

This application claims the benefit of U.S. Provisional Patent Application Nos. 60/996,085, filed on Oct. 26, 2007, and 60/924,374, filed on May 10, 2007, the contents of which are hereby incorporated by reference.

FIELD AND BACKGROUND OF THE INVENTION

As of today, a mobile subscriber roaming in another country can be registered into a roaming mobile network (the "visited network") and receive voice & data mobile services. That requires a roaming agreement between the home network of the subscriber and the visited network. In many cases, the roaming agreement covers only the voice part, and does not cover the data (such as the GPRS connectivity) part. In these cases, the roamer can have voice calls and SMSs, but can not connect to the data services, such as Internet browsing. There is a strong need therefore to provide a solution for the GPRS (or any other IP barrier) connection, without having a GPRS roaming agreement with the home network. The solution therefore should be implemented locally at the visited network, and should include the billing aspect, i.e. the ability of charging the roaming subscriber (who does not have any financial relations with the visited network).

Roaming subscribers in different countries either can not use their Original MSISDN due to different technologies (e.g. GSM, CDMA) or need to pay high tariffs.

The alternative of using VoIP and soft client on a PC or a mobile phone with the Original MSISDN has the limitation of the coverage of the broadband service (WiFi, WiMAX).

SUMMARY OF THE INVENTION

The idea is to split the roamer between two entities, the home and the visited networks. The inbound roamer (the roamer visiting a roaming mobile network) will register to the visited network for the voice/SMS services (i.e. GSM services, for a particular case of GSM), and will also register to the local network (the visited network) for GPRS data services. There will be two registrations in two different HLRs, but each one with a different IMSI. The home HLR will recognize the home IMSI, while the visited network will recognize the visited network IMSI. However the additional IMSI, of the visited network, will not be allocated by the SIM card, as in other dual-IMSI solutions. The local IMSI will be allocated in real time, when the user is registering to the local network. The IMSI will be allocated on-the-fly, during the signaling session, and there will be a dynamic replacement of the old IMSI with the new one. The IMSI replacement will cause the roamer to register in the local HLR as a local subscriber, and to be served by the local GGSN as a local subscriber. The IMSI will be a prepaid IMSI; the roamer will purchase a local prepaid user. This is how the roamer can be charged by the local network without having financial relations with the roamer. Another option would be to get the credit card information from the roamer. This can be done during the visit as well, after registration for GSM services, where the roamer can dial a specific local number (such as a short code) and use IVR, providing the credit card details.

Note also that this method can be used not only where there is no roaming agreement, but also in case where the GPRS roaming is too expensive, and there is a need for a local cheaper solution for IP connection. This solution can also be coordinated with the home network.

One implementation of the present teaching would allow receiving and calling with the original MSISDN, while in roaming, using the IP (GPRS, LTE or another) access of the roaming network, hence enjoy local network tariffs for the IP connectivity (instead of roaming tariffs).

Another possible implementation, as mentioned, is using cheaper voice calls, on top of the IP connection. The roaming mobile handset will access the IP mobile access as a local subscriber, but will be always connected. The original MSISDN (mobile phone number) will be always accessible via a VoIP (Voice over IP) client installed on the mobile device, and controlled by the home network. The user will also be able to receive/place calls (as well as SMS and other telephony services) on behalf of the local MSISDN number.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWING

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 describing the signaling flow of a first embodiment of the invention: registering a roaming mobile user with his/her home network for GSM, but with the local visited network for GPRS.

DESCRIPTION OF THE PREFERRED EMBODIMENTS

The present embodiment comprises a system, installed at the roaming mobile network (visited network), that enables the registration of a roaming user to the local network for GPRS (IP services in general), while the roamer is registered with her home network for receiving GSM services (such as calls and SMS).

Reference is now made to FIG. 1. During registration at the visited network, a signaling relay module (SRM), adapted for use in the present embodiments, monitors and intercepts MAP messages on the MAP international links going between the visited operator and the home operator. The MAP Authentication and MAP Update Location messages and responses (such as the MAP ISD) specifically will be managed. The GSM registration at the home network will not be modified, but the GPRS Authentication and GPRS Update Location messages, will be intercepted and routed to the local HLR, after IMSI replacement (using a local IMSI instead of the original IMSI). However in order for the SGSN to authenticate the user, the original triplets from the home network should be used, not the new ones received from the local HLR. This is because the handset/SIM card are using the original IMSI and other original identity keys for authentication. A gateway platform will keep then the original triplets received from the home HLR, during the GSM authentication, and will return them to the SGSN. The replies to the SGSN will include the original IMSI as well, so the SGSN can authenticate and register the roamer with its roaming identity. However at the HLR, the roaming will be registered with the local identity.

Now, when the roamer initiates a GPRS session, the messages from the SGSN will be routed to another network component, acting as a temporary GGSN for those subscribers which came from the specific home network where there is no GRPS roaming agreement with. This routing can be implemented in the SGSN, for the specific IMSI ranges, or in the local DNS, translating the APN into another IP address. As another alternative, the user profile at the SGSN can already include the address of the gateway platform as its GGSN. The gateway platform will manipulate the messages received from the SGSN, open the PDP context if needed, and replace the original IMSI again, with the local IMSI. Then, the gateway platform may forward the messages to the real local GGSN, acting as a temporary SGSN this time. The messages will get to the local GGSN with the local identity, and the roamer will be served as a local prepaid subscriber. A specific roaming page can be introduced, in the language of the roamer, for providing additional services for the roamer.

For enabling cheaper VoIP calls while at roaming, the handset will allow the installation of a SIP/VoIP client or any other IP-based client which can handle VoIP (Voice over IP) calls on the mobile device. The VoIP client on the mobile device opens a GPRS connection locally and stays connected always (in a local network rate). Calls can be made from the to the SIP client, like any other internet calls, such as Skype calls, for free, or for a low cost as the Skype-In (for incoming calls) or Skype-Out (for outgoing calls).

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system installed at a roaming mobile network, comprising:
   a signaling relay located at said roaming network, enabled to monitor, intercept and modify mobile network signaling messages between the roaming network and the home network,
   a controller application for the signaling relay, said controller configured to instruct the signaling relay to replace an identity of a roaming user retaining an original SIM card with a local network subscriber identity, to carry out registration of the roaming user with the local network, said registration being to provide telephony and related services, said registration with the local network being made with said local network subscriber identity provided by said signaling relay, for receiving at least one local mobile service as a local user, the roamer retaining a pre-existing registration with a respective home mobile network for receiving at least one other roaming mobile service, said pre-existing registration being associated with said original SIM card, wherein authentication of said roaming user with the roaming network uses authentication data of the home network registration, said local network subscriber identity and said roaming user identity each comprising respective international mobile subscriber identities (IMSI), said authentication data including triplets, the triplets being of the home network, wherein said local network subscriber identity comprises an IMSI (International Mobile Subscriber Identity) of the roaming network, replacing the IMSI of the home network, said authentication thereby providing said registration with said local network and said registration with said home network to be simultaneous, each registration providing respective services,
   said system being implemented as a signaling gateway at said roaming network.

2. The system of claim 1, wherein the local mobile service comprises a local GPRS connection to the internet.

3. The system of claim 1, wherein the roaming mobile service provided by the roaming network comprises GSM connectivity for placing and receiving voice calls.

4. The system of claim 1, wherein said authentication data form from the home network authentication comprises the information received by an HLR MAP-Authenticate query.

5. The system of claim 1, configured to support a roaming mobile device, such that the device when switched on is substantially always connected to the roaming mobile network as a local (non-roaming) subscriber, for at least one member of the group comprising:

IP-based services, running a Voice-over-IP client to enable the placing and receipt of voice calls, SMS, MMS, and WAP services.

* * * * *